United States Patent [19]

Spiridonov

[11] 3,903,704
[45] Sept. 9, 1975

[54] PIPELINE ANCHORING ARRANGEMENT

[76] Inventor: Viktor Vasilievich Spiridonov, 7 Parkovaya ulitsa, 23a, kv. 64, Moscow, U.S.S.R.

[22] Filed: Jan. 9, 1973

[21] Appl. No.: 322,196

[52] U.S. Cl. ........................ 61/46; 61/50; 61/72.1; 248/54; 248/49; 248/361
[51] Int. Cl. ...... E02d 27/36; E02d 27/46; F16l 3/02
[58] Field of Search ............. 61/50, 46, 36 A, 72.1, 61/72.3; 248/54, 55, 361, 49; 138/105

[56] References Cited
UNITED STATES PATENTS

| | | | |
|---|---|---|---|
| 2,352,318 | 6/1944 | Guarnaschelli | 248/54 |
| 2,442,833 | 6/1948 | Watkins | 248/54 |
| 2,540,525 | 2/1951 | Howarth et al. | 248/54 |
| 3,162,723 | 12/1964 | McCurtain | 248/54 |
| 3,637,174 | 1/1972 | Kuo | 248/54 |
| 3,734,137 | 5/1973 | Stanley | 138/105 |

FOREIGN PATENTS OR APPLICATIONS

| | | | |
|---|---|---|---|
| 207,930 | 7/1968 | U.S.S.R. | 248/351 |
| 250,626 | 6/1970 | U.S.S.R. | 61/72.1 |

*Primary Examiner*—Jacob Shapiro
*Attorney, Agent, or Firm*—Waters, Schwartz & Nissen

[57] ABSTRACT

The arrangement is designed for anchoring underwater and underground pipelines laid in wet and flood lands with swelling ground and permafrost areas and also where pipelines with varying temperature and pressure have to be made fast in the ground.

The arrangement comprises anchors secured in the ground. A fastening element attached to the pipeline is connected to the anchors through resilient connecting means capable of changing their length under load.

When ground swelling occurs, the forces set up by transverse displacement of the pipeline are taken by the resilient connecting means. The resilient connecting means can also be used for placing preload on the pipeline in order to increase its adhesion to the ground.

7 Claims, 9 Drawing Figures

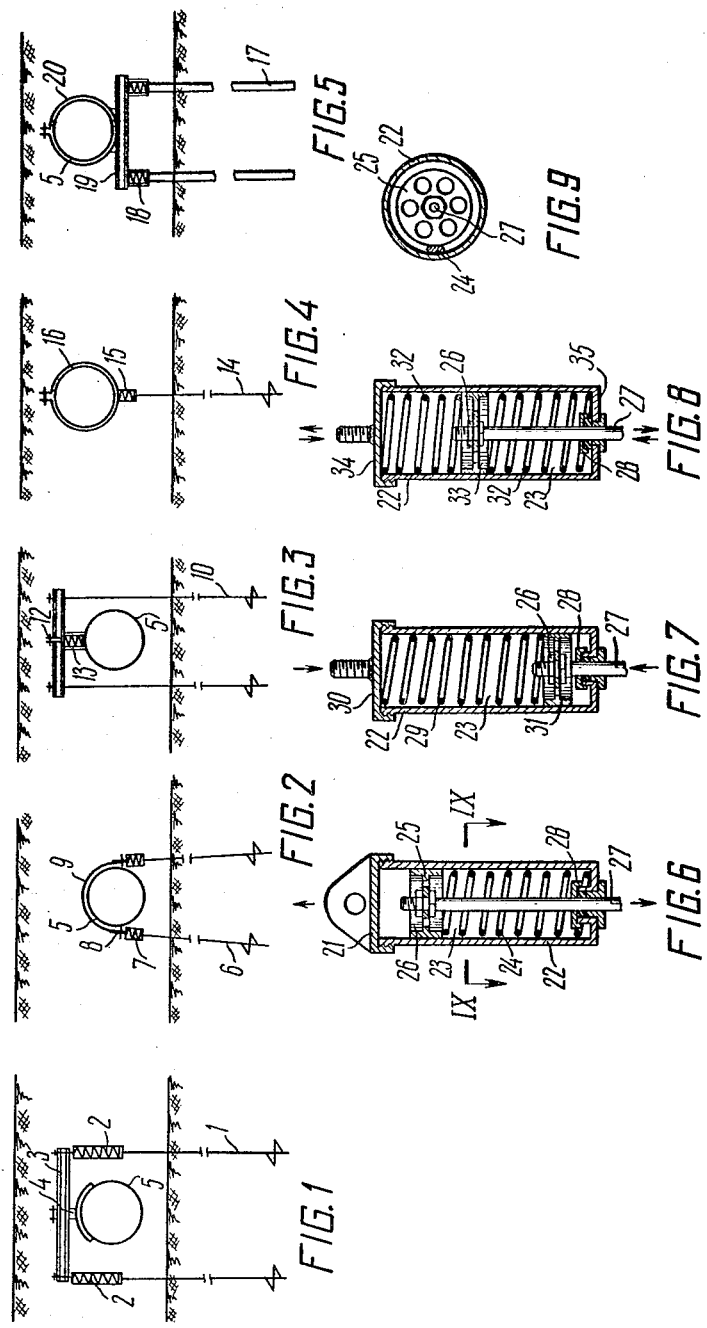

PIPELINE ANCHORING ARRANGEMENT

The present invention relates to construction facilities employed in swelling, waterlogged and loose ground, more particularly to arrangements for anchoring underwater and underground constructions such as pipelines laid in wet and flood lands with swelling ground and permafrost areas and also where pipelines with varying temperature and pressure have to be dealt with.

The arrangement may be used with particular advantage for anchoring gas and oil pipelines of large diameter (over 500 mm) laid below the ground surface in swelling ground or in permafrost areas, for example, in river flood plains in the vicinity of permafrost ground which, when melted, loses its substaining ability and is liable to frost swelling. The arrangement may also be advantageously used in irrigated lands for increasing ground adhesion of piping by friction or for securing high-temperature pipeline portions in loose ground (as is the case with compressor plant output piping).

It is known to use pipeline anchoring arrangements consisting of anchors and fastening elements fixedly secured to the anchors and the pipeline so that the latter is rigidly fastened and thus prevented from upward or downward displacement. Such arrangements are not used in ground liable to swelling as they cannot withstand immense stresses set up by ground swelling. In these circumstances it is known to use iron or ferroconcrete ballast weights. This method involves much labour and cost, especially in the cases where ballast weights have to be transported to far-away localities. Another case where rigid anchoring arrangements show a poor effect is frequently encountered with pipelines laid curvilinearly in a vertical plane. A change in pipeline temperature or pressure entails alteration of pipeline length and a consequent tendency for the curved portions of the piping to get displaced, this giving rise to considerable non-uniform overstresses on the anchoring arrangements. To provide against these overstresses, the arrangements under discussion have to be enlarged and used in greater quantities with consequent increase in the costs involved.

Apart from the disadvantages mentioned above, rigid anchoring arrangements seriously suffer from the disadvantage that they merely passively oppose pipeline displacement, i.e., if the pipeline does not tend to move transversely, the associated anchoring device does not act upon it in any way. There are circumstances, however, where it is very important to preload the anchoring arrangement, for example, in order to increase adhesion of the piping to the ground by virtue of friction.

It is an object of the present invention to provide a pipeline anchoring arrangement that will securely hold pipelines in swelling ground, permafrost conditions included.

It is a further object of the present invention to provide a pipeline anchoring arrangement that will act upon the pipeline so as to increase its adhesion to loose or low-cohesion ground.

It is a further object of the present invention to provide for uniform transmission of load from the pipeline to its anchoring arrangement and for reducing stresses in the pipeline portions secured by said anchoring arrangements.

It is a further object of the present invention to increase the scope and geographical applicability of pipeline anchoring arrangements.

It is a still further object of the present invention to cut down labour and costs involved in anchoring pipelines in permafrost swelling and loose ground.

With these and other objects in view, there is provided a pipeline anchoring arrangement comprising fastening means one of which interacts with the outside surface of the pipeline and the other is secured in the ground. According to the invention, there is at least one resilient connecting means which couples said fastenings means to each other, said resilient connecting means being so constructed that it is capable of changing its length when the pipeline is acted upon by disturbance forces exerted across the axis thereof and is also capable of restoring its initial state after the action of said disturbance forces has ceased.

According to one of the embodiments of the invention, the anchoring arrangement may be constructed with the first fastening means comprising a crossbar positioned over the pipeline and connected thereto, each end of said crossbar being joined by a resilient connecting means to the second fastening means — an anchor secured in the ground.

In another embodiment of the invention the first fastening means may comprise a crossbar positioned over the pipeline and connected thereto through a resilient connecting means, each end of said crossbar being joined direct to an anchor secured in the ground.

In a further embodiment of the invention the first fastening means may comprise a crossbar positioned underneath the pipeline and rigidly connected to a band embracing the pipeline, each end of said crossbar being connected by a resilient connecting means to a pile secured in the ground.

In a still further embodiment of the invention the first fastening means may comprise a band embracing the pipeline and connected by two resilient connecting means to anchors secured in the ground.

According to one of the embodiments of the invention, the anchoring arrangement may have a resilient element made in the form a cylinder accommodating a spring-loaded piston with a piston rod.

With the present invention put into practice, the ballast weights used heretofore for anchoring pipelines in permafrost and swelling ground may be advantageously replaced by anchoring arrangements with resilient elements which are several times cheaper and lighter than the ballast weights — a point of particular importance in far-away localities where transport costs are very high.

The pipeline anchoring arrangements with resilient connecting means are by far lighter than the reinforced concrete and cast iron ballast weights used currently and are, therefore, indispensable wherever access to the right-of-way is difficult.

The anchoring arrangements constructed in accordance with the present invention may be particularly useful where the adhesion of the pipelines to the ground has to be increased. The resilient connecting means enable the anchors and the pipeline to be preloaded so as to increase friction and thus improve adhesion of the pipeline to the ground without recourse to ballast weights.

The use of the pipeline anchoring arrangements with resilient connecting means permits of effecting great economies and materially saves labour both at the manufacturing works and in the field.

For a further understanding of the invention, it will now be described in detail with reference to the accompanying drawing in which:

FIG. 1 shows a pipeline anchoring arrangement with two resilient connecting means of the tension type and with a rigid crossbar having a tensioning device.

FIG. 2 shows a pipeline anchoring arrangement with two tension-type resilient connecting means having tensioning devices connected to a pipeline band.

FIG. 3 shows a pipeline anchoring arrangement with one resilient connecting means of the compression type.

FIG. 4 shows a pipeline anchoring arrangement with one resilient connecting means of the tension type.

FIG. 5 shows a pipeline anchoring arrangement with two resilient connecting means of the compression-tension type.

FIG. 6 shows a longitudinal sectional view of a tension-type resilient connecting means.

FIG. 7 shows a longitudinal sectional view of a compression-type resilient connecting means.

FIG. 8 shows a longitudinal sectional view of a compression-tension type resilient connecting means.

FIG. 9 is a cross section of the resilient connecting means on the line IX—IX of FIG. 6.

The pipeline anchoring arrangement which constitutes the present invention comprises two fastening means (FIG. 1). The first of said fastening means is made in the form of anchors 1 secured in the ground and is coupled by resilient connecting means 2 to the second fastening means which is essentially a crossbar 3 attached to the pipe 5 and provided with a tensioning device 4.

The resilient means are capable of changing their length when the associated pipeline is acted upon by transverse forces and are also capable of restoring their initial state after the action of said forces has ceased.

The pipeline anchoring arrangement depicted in FIG. 2 comprises anchors 6 connected by resilient connecting means 7 and tensioning devices 8 to a band 9 which embraces the pipe 5.

Another embodiment of the pipeline arrangement is shown in FIG. 3. The arrangement comprises anchors 10 attached to a crossbar 11 which is joined by a tensioning device 12 to a resilient connecting means 13 fastened to the pipe 5.

FIG. 4 shows a further embodiment of the pipeline anchoring arrangement which comprises an anchor 14 joined by a resilient connecting means 15 to a band 16 embracing the pipe 5.

In a further embodiment of the invention depicted in FIG. 5 the pipeline anchoring arrangement comprises anchorage piles 17 coupled by a resilient connecting means 18 to a cross bar 19 to which the pipe 5 is held by a band 20.

The construction and characteristics of the resilient connecting means are varied to suit the working conditions and the stresses and strains to be dealt with.

The resilient connecting means may be made of rubber or constructed in the form of a spring.

FIGS. 6 to 9 show, by way of example, various spring-type resilient connecting means.

The resilient connecting means depicted in FIG. 6 is of the tension spring type. It comprises a head 21 which has provision for attachment to a crossbar or a pipe band. The head 21 closes a cylinder 22 which contains a non-freezing substance 23 and accommodates a spring 24 and a piston 25. An adjustment unit 27 attaches a piston rod 27 to the piston. The piston rod is made tight in the bottom end of the cylinder by a seal 28.

The resilient connecting means depicted in FIG. 7 is of the compression spring type. It comprises essentially the same components as the tension spring resilient connecting means shown in FIG. 6, but the spring 29 is located between the head 30 and the piston 31.

The resilient connecting means depicted in FIG. 8 is of the tension-compression type. It comprises essentially the same components as the resilient connecting means shown in FIG. 6, but has two springs 32 located one on each side of the piston 33.

When the pipeline is displaced as may be the case when frost swelling of the ground occurs, the resilient connecting means becomes compressed and the load transmitted from the anchors to the pipe 5 increases. In spring, when the ground at the pipeline melts and loses its substaining abaility, the resilient connecting means extends and returns the pipeline into its initial position.

In the case of pipelines with varying temperature or pressure the resilience of the anchorages makes for reduction of transverse loads arising due to changes in the pipeline length and renders the distribution of said loads between the anchoring arrangements more uniform.

Where a heavier grip on the pipeline is required and also in other cases it may be expedient to preload the anchoring arrangements.

For the purpose, after the arrangement is installed, the tension of the resilient connecting means is increased by the use of the tensioning device, whereby an adjustable preload is placed on the pipeline.

The arrangement shown in FIG. 1 is most suitable for use in a heavily swelling ground where the resilient connecting means have to be of considerable length to provide for the pipeline displacement involved.

The arrangement shown in FIG. 2 is recommended for preloading the anchors 6 in order to increase the adhesion of the pipe 5 to the ground and to limit displacement of the pipe 5.

The arrangement shown in FIG. 3 is most suitable for use in the cases where the pipe 5 is laid at a considerable depth and also where a previously laid pipeline has to be additionally loaded.

The arrangement shown in FIG. 4 is recommended for use with small-diameter pipelines in the cases where anchors can be installed beforehand and also when laying pipelines in a heavily wetted ground.

The arrangement shown in FIG. 5 is recommended for use with pile anchorage.

The spring-type resilient connecting means shown in FIGS. 6 and 9 is intended for use with the anchoring arrangements wherein the load transmitted from the pipeline extends the resilient connecting means (FIGS. 1, 2 and 4).

The spring-type resilient connecting means shown in FIG. 7 is intended for use with the anchoring arrangements wherein the load transmitted from the pipeline compresses the resilient connecting means (FIGS. 3 and 5).

The spring-type resilient connecting means shown in FIG. 8 is intended for use with the anchoring arrangements wherein the load transmitted from the pipeline extends or compresses the resilient connecting means (refer to FIG. 5), as in the case with pipeline portions the temperature of which periodically changes due to which transverse displacement of the pipeline occurs in loose ground.

The provision of resilient connecting means makes it possible to greatly increase the scope and geographical applicability of the pipeline anchoring arrangements, prolongs their life and reduces the number of the anchoring arrangements required for a unit of the pipeline length.

Owing to these features, the anchoring arrangements with resilient connecting means can be used to a much greater advantage than the rigid anchoring arrangements known hetherto.

What is claimed is:

1. A pipeline anchoring arrangement comprising first fastening means interacting with the outer surface of the pipeline; second fastening means secured in the ground; at least one resilient connecting means coupling said first and second fastening means to each other, said resilient connecting means changing its length elastically when the pipeline is acted upon by disturbant forces exerted across the axis of said pipeline, said connecting means restoring its initial length after the action of said disturbant forces is removed.

2. An arrangement as claimed in claim 1, in which the first fastening means comprises a crossbar positioned over the pipeline and connected thereto by a resilient connecting means, each end of said crossbar being joined direct to an anchor secured in the ground.

3. An arrangement as claimed in claim 1, in which the first fastening means comprises a crossbar positioned underneath the pipeline and rigidly connected to a band embracing the pipeline, each end of said crossbar being connected by a resilient connecting means to a pile secured in the ground.

4. An arrangement as claimed in claim 1, in which the first fastening means comprises a band embracing the pipeline and connected by one resilient connecting means to an anchor secured in the ground.

5. An arrangement as claimed in claim 1, in which said first fastening means comprises a band embracing the pipeline and connected by two resilient connecting means to anchors secured in the ground.

6. A pipeline anchoring arrangement comprising first fastening means interacting with the outer surface of the pipeline; second fastening means secured in the ground; at least one resilient connecting means coupling said first and second fastening means to each other, said resilient connecting means changing its length elastically when the pipeline is acted upon by disturbant forces exerted across the axis of said pipeline, said connecting means restoring its initial length after the action of said disturbant forces is removed, said first fastening means comprising a crossbar positioned over the pipeline and rigidly connected thereto, each end of said crossbar being joined by said resilient connecting means to said second fastening means, said second fastening means being an anchor secured in the ground.

7. A pipeline anchoring arrangement comprising first fastening means interacting with the outer surface of the pipeline; second fastening means secured in the ground; at least one resilient connecting means coupling said first and second fastening means to each other, said resilient connecting means being substantially a cylinder with a spring-loaded piston and piston rod, said cylinder and piston rod being connected between said first and second fastening means, said resilient connecting means having sealing means for preventing earth from entering the cylinder.

* * * * *